(12) United States Patent
Ella et al.

(10) Patent No.: US 12,488,275 B1
(45) Date of Patent: Dec. 2, 2025

(54) BUFFERING THE CONTROL OF A QUANTUM DEVICE

(71) Applicant: Quantum Machines, Tel Aviv (IL)

(72) Inventors: Lior Ella, Tel Aviv (IL); Nir Halay, Tel Aviv (IL); Ori Weber, Tel Aviv (IL); Uri Abend, Tel Aviv (IL); Yonatan Cohen, Tel Aviv (IL); Nissim Ofek, Tel Aviv (IL); Itamar Sivan, Tel Aviv (IL)

(73) Assignee: Q.M Technologies Ltd. (IL)

( * ) Notice: Subject to any disclaimer, the term of this patent is extended or adjusted under 35 U.S.C. 154(b) by 13 days.

(21) Appl. No.: 18/132,128

(22) Filed: Apr. 7, 2023

Related U.S. Application Data

(63) Continuation of application No. 17/740,510, filed on May 10, 2022, now abandoned.

(51) Int. Cl.
*G06N 10/80* (2022.01)
*G06F 13/42* (2006.01)

(52) U.S. Cl.
CPC ............. *G06N 10/80* (2022.01); *G06F 13/42* (2013.01)

(58) Field of Classification Search
CPC ............................... G06N 10/80; G06F 13/42
USPC ................... 710/15, 30, 52, 62, 65, 105
See application file for complete search history.

(56) References Cited

U.S. PATENT DOCUMENTS

| 4,875,484 A | 10/1989 | Anzai et al. |
|---|---|---|
| 5,063,354 A | 11/1991 | Lauper et al. |
| 5,194,907 A | 3/1993 | Hayashi |
| 6,223,228 B1 | 4/2001 | Ryan et al. |
| 6,426,984 B1 | 7/2002 | Perino et al. |
| 6,993,108 B1 | 1/2006 | Chi et al. |
| 7,451,292 B2 | 11/2008 | Routt |
| 7,535,931 B1 | 5/2009 | Zampetti et al. |
| 7,627,126 B1 | 12/2009 | Pikalo |

(Continued)

FOREIGN PATENT DOCUMENTS

| CA | 2420022 A1 | 2/2003 |
|---|---|---|
| CN | 104467843 A | 3/2015 |

(Continued)

OTHER PUBLICATIONS

Lavoie et al., "A Formalization for Specifying and Implementing Correct Pull-Stream Modules," in arXiv preprint arXiv: 1801.06144 (2018). (Year: 2018).

(Continued)

*Primary Examiner* — Idriss N Alrobaye
*Assistant Examiner* — Henry W Yu
(74) *Attorney, Agent, or Firm* — McAndrews, Held & Malloy, Ltd.

(57) ABSTRACT

In a quantum computer, quantum algorithms are performed by a qubit interacting with a quantum control pulse. This quantum control pulse is an electromagnetic RF signal that is generated at baseband according to an analog waveform. An application circuit digitally generates samples of this analog waveform. These waveform samples are further modified according to post-processing instructions. To avoid processing gaps, the waveform samples and the modification instructions are maintained in buffers that are accessed independently. To maintain coherency, the waveform samples and the modification instructions are read simultaneously by an execution controller.

33 Claims, 4 Drawing Sheets

(56) References Cited

U.S. PATENT DOCUMENTS

| | | | |
|---|---|---|---|
| 8,315,969 B2 | 11/2012 | Roetteler | |
| 8,385,878 B2 | 2/2013 | Rao | |
| 8,750,717 B1 | 6/2014 | Yap et al. | |
| 9,207,672 B2 | 12/2015 | Williams | |
| 9,400,499 B2 | 7/2016 | Williams | |
| 9,509,324 B2 | 11/2016 | McDonald et al. | |
| 9,663,358 B1 | 5/2017 | Cory et al. | |
| 9,692,423 B2 | 6/2017 | McDermott, III | |
| 9,847,121 B2 | 12/2017 | Frank | |
| 9,858,531 B1 | 1/2018 | Monroe | |
| 9,892,365 B2 | 2/2018 | Rigetti | |
| 9,978,020 B1 | 5/2018 | Gambetta | |
| 9,979,400 B1 | 5/2018 | Sete | |
| 9,996,801 B2 | 6/2018 | Shim | |
| 10,063,228 B2 | 8/2018 | Deurloo et al. | |
| 10,122,351 B1 | 11/2018 | Naaman | |
| 10,127,499 B1 | 11/2018 | Rigetti | |
| 10,192,168 B2 | 1/2019 | Rigetti | |
| 10,223,643 B1* | 3/2019 | Bishop | G06N 10/70 |
| 10,333,503 B1 | 6/2019 | Cohen et al. | |
| 10,454,459 B1 | 10/2019 | Cohen | |
| 10,496,069 B2 | 12/2019 | Nazarathy et al. | |
| 10,505,524 B1 | 12/2019 | Cohen | |
| 10,560,076 B1 | 2/2020 | Cohen | |
| 10,637,449 B1 | 4/2020 | Cohen et al. | |
| 10,659,018 B1 | 5/2020 | Cohen | |
| 10,666,238 B1 | 5/2020 | Cohen | |
| 10,958,253 B1 | 3/2021 | Cohen et al. | |
| 10,985,739 B2 | 4/2021 | Cohen et al. | |
| 11,010,145 B1 | 5/2021 | Smith et al. | |
| 11,463,075 B2 | 10/2022 | Cohen et al. | |
| 11,616,497 B2 | 3/2023 | Cohen et al. | |
| 11,616,498 B2 | 3/2023 | Cohen et al. | |
| 2001/0025012 A1* | 9/2001 | Tarutani | H03F 19/00 |
| | | | 505/100 |
| 2002/0004876 A1 | 1/2002 | Timmer et al. | |
| 2002/0114032 A1* | 8/2002 | Salzman | G02F 1/3515 |
| | | | 359/484.06 |
| 2002/0171920 A1* | 11/2002 | Sugawara | B82Y 20/00 |
| | | | 359/344 |
| 2003/0058500 A1* | 3/2003 | Sugawara | H04B 10/2914 |
| | | | 398/98 |
| 2004/0266084 A1 | 12/2004 | Fujishima et al. | |
| 2005/0015422 A1 | 1/2005 | Kohn et al. | |
| 2005/0180575 A1 | 8/2005 | Maeda et al. | |
| 2006/0093376 A1 | 5/2006 | Mitchell et al. | |
| 2008/0037693 A1 | 2/2008 | Andrus et al. | |
| 2010/0072979 A1 | 3/2010 | Fefer et al. | |
| 2011/0035511 A1 | 2/2011 | Biederman | |
| 2013/0198499 A1 | 8/2013 | Dice et al. | |
| 2016/0125311 A1 | 5/2016 | Fuechsle et al. | |
| 2016/0267032 A1 | 9/2016 | Rigetti et al. | |
| 2016/0292586 A1 | 10/2016 | Rigetti et al. | |
| 2017/0094618 A1 | 3/2017 | Bjorkengren | |
| 2017/0214410 A1 | 7/2017 | Hincks et al. | |
| 2017/0364796 A1 | 12/2017 | Wiebe | |
| 2018/0013426 A1 | 1/2018 | Deurloo et al. | |
| 2018/0032893 A1 | 2/2018 | Epstein | |
| 2018/0091244 A1 | 3/2018 | Abdo | |
| 2018/0107579 A1 | 4/2018 | Chapman | |
| 2018/0123597 A1 | 5/2018 | Sete | |
| 2018/0237039 A1 | 8/2018 | Mong et al. | |
| 2018/0260245 A1 | 9/2018 | Smith | |
| 2018/0260730 A1 | 9/2018 | Reagor | |
| 2018/0260732 A1 | 9/2018 | Bloom | |
| 2018/0308007 A1 | 10/2018 | Amin | |
| 2018/0322409 A1 | 11/2018 | Barends | |
| 2018/0365585 A1 | 12/2018 | Smith | |
| 2018/0373995 A1 | 12/2018 | Tomaru et al. | |
| 2018/0375650 A1 | 12/2018 | Legre | |
| 2019/0042964 A1 | 2/2019 | Elsherbini et al. | |
| 2019/0042965 A1 | 2/2019 | Clarke | |
| 2019/0042970 A1 | 2/2019 | Zou | |
| 2019/0042971 A1 | 2/2019 | Zou | |
| 2019/0042972 A1 | 2/2019 | Zou | |
| 2019/0042973 A1 | 2/2019 | Zou | |
| 2019/0049495 A1* | 2/2019 | Ofek | G01R 33/1284 |
| 2019/0251478 A1 | 8/2019 | Bishop et al. | |
| 2019/0266512 A1 | 8/2019 | Shen et al. | |
| 2019/0302832 A1 | 10/2019 | Morgan et al. | |
| 2019/0317589 A1 | 10/2019 | Mathur et al. | |
| 2019/0385088 A1 | 12/2019 | Naaman et al. | |
| 2020/0293080 A1 | 9/2020 | Poon et al. | |
| 2020/0364602 A1 | 11/2020 | Niu et al. | |
| 2021/0004707 A1 | 1/2021 | Gambetta et al. | |
| 2021/0103847 A1 | 4/2021 | Akzam | |
| 2021/0125096 A1 | 4/2021 | Puri et al. | |
| 2021/0194487 A1* | 6/2021 | Liu | G06N 10/20 |
| 2021/0359670 A1 | 11/2021 | Cohen et al. | |
| 2022/0253737 A1* | 8/2022 | Kanazawa | G06N 10/40 |
| 2022/0253740 A1* | 8/2022 | Johnson | G06F 30/30 |
| 2022/0335319 A1* | 10/2022 | Zhang | G06N 10/00 |
| 2023/0176935 A1* | 6/2023 | Earnest-Noble | G06F 11/004 |
| | | | 714/47.2 |

FOREIGN PATENT DOCUMENTS

| | | |
|---|---|---|
| CN | 105281886 A | 1/2016 |
| CN | 105912070 A | 8/2016 |
| CN | 108111306 A | 6/2018 |
| CN | 108594214 A | 9/2018 |
| CN | 110085094 A | 8/2019 |
| CN | 110677210 A | 1/2020 |
| CN | 111464154 A | 7/2020 |
| CN | 111767055 A | 10/2020 |
| CN | 112019193 A | 12/2020 |
| CN | 112149832 A | 12/2020 |
| EP | 0388052 A2 | 9/1990 |
| JP | 2011175078 A | 9/2011 |
| JP | 2012188875 A | 10/2012 |
| WO | 2015178991 A2 | 11/2015 |
| WO | 2015178992 A2 | 11/2015 |
| WO | 2017078735 A1 | 5/2017 |
| WO | 2017123940 A | 7/2017 |
| WO | 2017139683 A1 | 8/2017 |
| WO | 2018055607 A1 | 3/2018 |
| WO | 2018062991 A1 | 4/2018 |
| WO | 2019063117 A1 | 4/2019 |
| WO | 2020033807 A1 | 2/2020 |
| WO | 2020231795 A1 | 11/2020 |
| WO | 2021123903 A1 | 6/2021 |
| WO | WO-2021225447 A1 * | 11/2021 ......... G06F 9/44521 |

OTHER PUBLICATIONS

Fu et al., "A Microarchitecture for a Superconducting Quantum Processor," in 38.3 I EEE Micro 40-47 (2018). (Year: 2018).

Extended European Search Report Appln No. 20845965.1 dated Jun. 29, 2023.

European Office Communication with extended Search Report Appln No. 20861242.4 dated Jul. 7, 2023.

European Office Communication with extended Search Report Appln No. 23153085.8 dated Jul. 3, 2023.

Yang Yet al: "FPGA-based electronic system for the control and readout of superconducting qubit systems", arxiv.org, Cornell University Library, 201 Yang Yet al: "FPGA-based electronic system for the control and readout of superconducting qubit systems", arxiv.org, Cornell University Library, 201 Olin Library Cornell University Ithaca, NY 14853, Oct. 15, 2021 (Oct. 15, 2021), XP091078848.

Gebauer Richard et al: "A modular RFSoC-based approach to interface superconducting quantum bits", 2021 International Conference on Field-Programmable Technology (ICFPT), IEEE, Dec. 6, 2021 (Dec. 6, 2021), pp. 1-9, XP034028257, DOI: 10.1109/ICFPT52863.2021.9609909 [retrieved on Nov. 8, 2021].

European Office Communication with extended Search Report Appln No. 20861100.4 dated Jul. 21, 2023.

Fu et al. "eQASM: An Executable Quantum 1-15 Instruction Set Architecture", 2019 IEEE International Symposium on High Performance Computer Architecture (HPCA), IEEE Feb. 16, 2019 (Feb. 16, 2019), pp. 224-237, XP033532496, DOI: 10.1109/HPCA.

(56) References Cited

OTHER PUBLICATIONS 2019.00040 Retrieved from the Internet: URL: https://ieeexplore.ieee.org/abstract/document/8675197/authors#authors [retrieved on Mar. 26, 2019].
Yunong Shi et al: "Optimized Compilation of Aggregated Instructions for Realistic Quantum Computers", arxiv.org, Cornell University Library, 201 Olin Library Cornell University Ithaca, NY 14853, Feb. 4, 2019 (Feb. 4, 2019), XP081025321, DOI: 10.1145/3297858.3304018.
U.S. Appl. No. 62/294,966, filed Feb. 12, 2016.
Int'l Search Report and Written Opinion Appln No. PCT/IB2019/001410 mailed Jun. 10, 2020.
Int'l Search Report and Written Opinion Appln No. PCT/IB2019/001394 mailed Jun. 17, 2020.
Zhang J, Hegde SS, Suter D. Pulse sequences for controlled 2-and 3-qubit gates in a hybrid quantum register. arXiv preprint arXiv:1806.08408. Jun. 21, 2018.
Wang CY, Kuznetsova L, Gkortsas VM, Diehl L, Kaertner FX, Belkin MA, Belyanin A, Li X, Ham D, Schneider H, Grant P. Mode-locked pulses from mid-infrared quantum cascade lasers. Optics Express. Jul. 20, 2009;17(15):12929-43.
Int'l Search Report and Written Opinion Appln No. PCT/IB2020/000218 mailed Aug. 11, 2020.
Quan R, Zhai Y, Wang M, Hou F, Wang S, Xiang X, Liu T, Zhang S, Dong R. Demonstration of quantum synchronization based on second-order quantum coherence of entangled photons. Scientific reports. Jul. 25, 2016;6:30453. Jul. 25, 2016 (Jul. 25, 2016).
Int'l Search Report and Written Opinion Appln No. PCT/IB2020/000376 mailed Sep. 17, 2020.
Breitfelder et al. eds., IEEE 100: The Authoritative Dictionary of IEEE Standards Terms 1247, definition 2 of "variable" (7th ed. 2000). (Year: 2000).
Int'l Search Report and Written Opinion Appln No. PCT/IB2020/000707 mailed Jan. 12, 2021.
National Academies of Sciences, Engineering, and Medicine. "Quantum Computing: Progress and Prospects". eprint (Dec. 2018) [online]. [retrieved on Jan. 7, 2020]. retrieved from: <https://doi.org/10.17226/25196.> Dec. 4, 2018 (Dec. 4, 2018) pp. 114, 142, 210, Fig. 2.5, Qiskit Backend Specifications at footnote 57: section 4.2, 5.1.5, Fig. 3, Fig. 4 , pp. 30, 57.
IBM Research. "Qiskit Backend Specifications for OpenQASM and OpenPulse Experiments". eprint arXiv:1809.03452v1 (Sep. 10, 2018) [online]. [retrieved on Jan. 7, 2020]. retrieved from: <https://arxiv.org/pdf/1809.03452.pdf> Sep. 10, 2018 (Sep. 10, 2018) section 4.2, 5.1.5, Fig. 3, Fig. 4 , pp. 30, 57.
Int'l Search Report and Written Opinion Appln No. PCT/IB2020/000704 mailed Jan. 17, 2021.
Wolfowicz, et al. Pulse Techniques for Quantum Information Processing University of Chicago, University College London, eMagRes, 2016, vol. 5: 1515-1528. DOI 10.1002/9780470034590.emrstm1521.
Int'l Search Report and Written Opinion Appln No. PCT/IB2020/000555 mailed Dec. 27, 2020.
Int'l Search Report and Written Opinion Appln No. PCT/IB2020/000760 mailed Jan. 27, 2021.
"Quantum-classical interface based on single flux quantum digital logic". In: Quantum Science and Technology 3.2 (2018), pp. 1-16. DOI: 10.1088/2058-9565/aaa3a0.(retrieved on Jan. 20, 2021). Retrieved from the Internet: <https://arxiv.org/pdf/1710.04645.pdf> McDermott R. et al. Oct. 12, 2017 (Oct. 12, 2017) Section VI, VII, VIII.
Roffe, J., Quantum Error Correction: An Introductory Guide, Dept. of Physics & Astronomy, Univ. of Sheffeld, UK, Oct. 10, 2019, pp. 1-29.
Int'l Search Report and Written Opinion Appln No. PCT/IB2020/001004 mailed May 13, 2021.
Int'l Preliminary Report on Patentability Appln No. PCT/IB2019/001410 mailed Jun. 10, 2021.
Int'l Search Report and Written Opinion Appln No. PCT/IB2021/000067 mailed Jun. 21, 2021.
Int'l Preliminary Report on Patentability Appln No. PCT/IB2019/001394 mailed Jul. 29, 2021.
Int'l Preliminary Report on Patentability Appln No. PCT/IB2020/000218 mailed Sep. 16, 2021.
Int'l Preliminary Report on Patentability Appln No. PCT/IB2020/000376 mailed Nov. 12, 2021.
Int'l Search Report and Written Opinion Appln No. PCT/IB2021/056254 mailed Dec. 1, 2021.
Ribeiro, Diogo C., Pedro M. Cruz, and Nuno Borges Carvalho, "Towards a denser frequency grid in phase measurements using mixer-based receivers." 2015 85th Microwave Measurement Conference (ARFTG). IEEE, 2015. Dec. 31, 2015 (Dec. 31, 2015).
Int'l Preliminary Report on Patentability Appln No. PCT/IB2020/000555 mailed Feb. 10, 2022.
Int'l Preliminary Report on Patentability Appln No. PCT/IB2020/000707 mailed Mar. 17, 2022.
Int'l Preliminary Report on Patentability Appln No. PCT/IB2020/000704 mailed Mar. 17, 2022.
Int'l Preliminary Report on Patentability Appln No. PCT/IB2020/000760 mailed Apr. 7, 2022.
Int'l Search Report and Written Opinion Appln No. PCT/IB2022/050190 mailed Apr. 11, 2022.
Int'l Search Report and Written Opinion Appln No. PCT/IB2022/000059 mailed Jul. 7, 2022.
Moreira , "QuTech Central Controller: A Quantum Control Architecture for a Surface-17 Logical Qubit." Delft University of Technology Student Theses Collection (2019). Available at the following URL: http://resolver.tudelft.nl/uuid:502ed5e5-87f7-42bd-a077-c24b7281cd94 May 10, 2019 (May 10, 2019).
Int'l Preliminary Report on Patentability Appln No. PCT/IB2020/001004 mailed Jun. 30, 2022.
Int'l Search Report and Written Opinion Appln No. PCT/IB2022/000024 mailed Jul. 18, 2022.
Baier, Simon, Matteo Pompili, Sophie LN Hermans, Hans KC Beukers, Peter C. Humphreys, Raymond N. Schouten, Raymond FL Vermeulen et al. "Realization of a Multi-Node Quantum Network of Remote Solid-State Qubits", Science, vol. 372, pp. 259-264 (2021) Baier Simon Apr. 16, 2021 (Apr. 16, 2021).
Int'l Search Report and Written Opinion Appln No. PCT/IB2022/000068 mailed Jul. 17, 2022.
D. Copsey et al., "Toward a scalable, silicon-based quantum computing architecture," in IEEE Journal of Selected Topics in Quantum Electronics, vol. 9, No. 6, pp. 1552-1569, Nov.-Dec. 2003, doi: 10.1109/JSTQE.2003.820922. Dec. 31, 2003 (Dec. 31, 2003).
Extended European Search Report Appln No. 19889443.8 dated Aug. 4, 2022.
Int'l Search Report and Written Opinion Appln No. PCT/IB2022/054903 mailed Sep. 8, 2022.
Int'l Preliminary Report on Patentability Appln No. PCT/IB2021/000067 mailed Sep. 22, 2022.
Int'l Search Report and Written Opinion Appln No. PCT/IB2022/053304 mailed Oct. 6, 2022.
Serrano, Javier, M. Lipinski, T. Wlostowski, E. Gousiou, Erik van der Bij, M. Cattin, and G. Daniluk. "The white rabbit project." (2013) Sep. 19, 2013 (Sep. 19, 2013) Entire document.
Extended European Search Report Appln No. 19910800.2 dated Oct. 6, 2022.
Hornibrook J M et al: "Cryogenic Control Architecture for Large-Scale Quantum Computing", arxiv.org, Cornell University Library, 201 Olin Library Cornell University Ithaca, NY 14853, Sep. 8, 2014 (Sep. 8, 2014), XP081391509.
Fu X et al: "An Experimental Microarchitecture for a Superconducting Quantum Processor", MICRO-50 '17: Proceedings of the 50th Annual IEEE/ACM International Symposium on Microarchitecture, Cornell University Library, 201 Olin Library Cornell University Ithaca, NY 14853, Oct. 14, 2017 (Oct. 14, 2017), pp. 1-13, XP081291220.
Zopes J et al: "High resolution quantum sensing with shaped control pulses", arxiv.org, Cornell University Library, 201 Olin Library Cornell University Ithaca, NY 14853, May 22, 2017 (May 22, 2017), XP081276850.
Cross et al. "Open Quantum Assembly Language", Jan. 10, 2017.

(56) References Cited

OTHER PUBLICATIONS

European Office Communication with extended Search Report Appln No. 20766036.6 dated Nov. 24, 2022.
Japanese Patent Office Action Appln No. 2021-529723 dated Oct. 26, 2022 with translation.

* cited by examiner

BUFFERING THE CONTROL OF A QUANTUM DEVICE

BACKGROUND

Limitations and disadvantages of conventional quantum devices without buffering will become apparent to one of skill in the art, through comparison of such approaches with some aspects of the present method and system set forth in the remainder of this disclosure with reference to the drawings.

BRIEF SUMMARY

Methods and systems are provided for buffering the control of a quantum device, substantially as illustrated by and/or described in connection with at least one of the figures, as set forth more completely in the claims.

DETAILED DESCRIPTION

Figure 1:
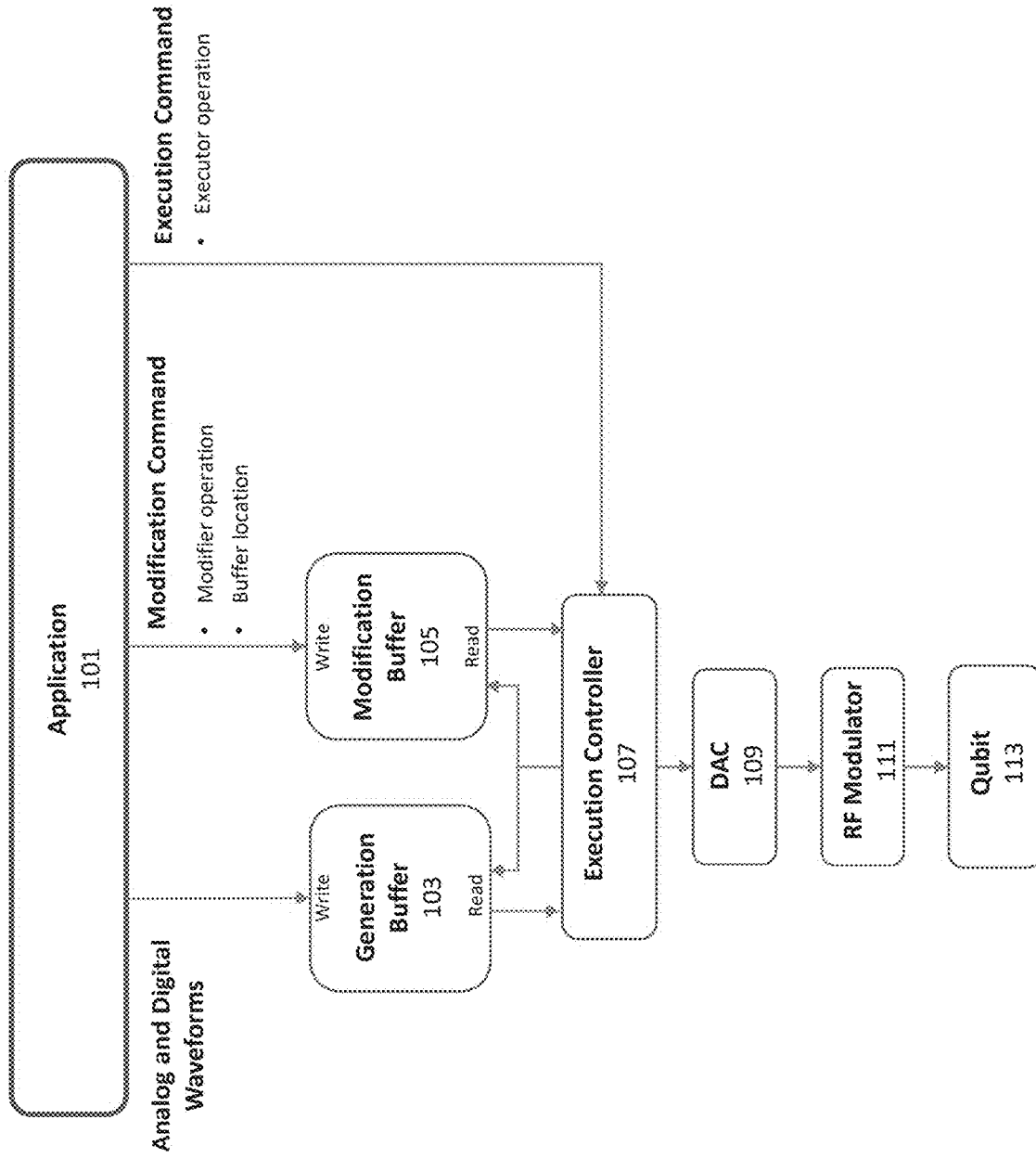
FIG. 1 illustrates a first example system for buffering the control of a quantum device in accordance with various example implementations of this disclosure.

Classical computers operate by storing information in the form of binary digits ("bits") and processing those bits via binary logic gates. At any given time, each bit takes on only one of two discrete values: 0 (or "off") and 1 (or "on"). The logical operations performed by the binary logic gates are defined by Boolean algebra and circuit behavior is governed by classical physics. In a modern classical system, the circuits for storing the bits and realizing the logical operations are usually made from electrical wires that can carry two different voltages, representing the 0 and 1 of the bit, and transistor-based logic gates that perform the Boolean logic operations.

Logical operations in classical computers are performed on fixed states. For example, at time 0 a bit is in a first state, at time 1 a logic operation is applied to the bit, and at time 2 the bit is in a second state as determined by the state at time 0 and the logic operation. The state of a bit is typically stored as a voltage (e.g., 1 Vac for a "1" or 0 Vac for a "0"). The logic operation typically comprises of one or more transistors.

Obviously, a classical computer with a single bit and single logic gate is of limited use, which is why modern classical computers with even modest computation power contain billions of bits and transistors. That is to say, classical computers that can solve increasingly complex problems inevitably require increasingly large numbers of bits and transistors and/or increasingly long amounts of time for carrying out the algorithms. There are, however, some problems which would require an infeasibly large number of transistors and/or infeasibly long amount of time to arrive at a solution. Such problems are referred to as intractable.

Quantum computers operate by storing information in the form of quantum bits ("qubits") and processing those qubits via quantum gates. Unlike a bit which can only be in one state (either 0 or 1) at any given time, a qubit can be in a superposition of the two states at the same time. More precisely, a quantum bit is a system whose state lives in a two dimensional Hilbert space and is therefore described as a linear combination $\alpha|0> + \beta|1>$, where $|0>$ and $|1>$ are two basis states, and $\alpha$ and $\beta$ are complex numbers, usually called probability amplitudes, which satisfy $|\alpha|^2 + |\beta|^2 = 1$. Using this notation, when the qubit is measured, it will be 0 with probability $|\alpha|^2$ and will be 1 with probability $|\beta|^2$. The basis states $|0>$ and $|1>$ can also be represented by two-dimensional basis vectors $$\begin{bmatrix} 1 \\ 0 \end{bmatrix}$$

and $$\begin{bmatrix} 0 \\ 1 \end{bmatrix},$$

respectively. The qubit state may represented by $$\begin{bmatrix} \alpha \\ \beta \end{bmatrix}.$$

The operations performed by the quantum gates are defined by linear algebra over Hilbert space and circuit behavior is governed by quantum physics. This extra richness in the mathematical behavior of qubits and the operations on them, enables quantum computers to solve some problems much faster than classical computers. In fact, some problems that are intractable for classical computers may become trivial for quantum computers.

Unlike a classical bit, a qubit cannot be stored as a single voltage value on a wire. Instead, a qubit is physically realized using a two-level quantum mechanical system. For example, at time 0 a qubit is described as $$\begin{bmatrix} \alpha_1 \\ \beta_1 \end{bmatrix},$$

at time 1 a logic operation is applied to the qubit, and at time 2 the qubit is described as $$\begin{bmatrix} \alpha_2 \\ \alpha_b \end{bmatrix}.$$

Many physical implementations of qubits have been proposed and developed over the years. Some examples of qubits implementations include superconducting circuits, spin qubits, and trapped ions.

A quantum orchestration platform (QOP) may comprise a quantum controller (QC), a quantum programming subsystem and a quantum processor.

A QC generates the precise series of external signals, usually pulses of electromagnetic waves and pulses of base band voltage, to perform the desired logic operations (and thus carry out the desired quantum algorithm).

The quantum programming subsystem comprises circuitry capable of generating a quantum algorithm description which configures the QC and includes instructions the QC can execute to carry out the quantum algorithm (i.e., generate the necessary outbound quantum control pulse(s)) with little or no human intervention during runtime. In an example implementation, the quantum programming system is a personal computer comprising a processor, memory, and other associated circuitry (e.g., an x86 or x64 chipset). The quantum programming subsystem then compiles the high-level quantum algorithm description to a machine code version of the quantum algorithm description (i.e., series of binary vectors that represent instructions that the QC's hardware can interpret and execute directly).

The quantum programming subsystem may be coupled to the QC via an interconnect which may, for example, utilize a universal serial bus (USB), a peripheral component interconnect (PCIe) bus, wired or wireless Ethernet, or any other suitable communication protocol.

The QC comprises circuitry operable to load the machine code quantum algorithm description from the programming subsystem via the interconnect. Then, execution of the machine code by the QC causes the QC to generate the necessary outbound quantum control pulse(s) that correspond to the desired operations to be performed on the quantum processor (e.g., sent to qubit(s) for manipulating a state of the qubit(s) or to readout resonator(s) for reading the state of the qubit(s), etc.). The machine code may also cause the QC to perform an analysis on an input signal. The analysis result may be used to determine the state of the qubit or the quantum register (quantum measurement). Depending on the quantum algorithm to be performed, outbound pulse(s) for carrying out the algorithm may be predetermined at design time and/or may need to be determined during runtime. The runtime determination of the pulses may comprise performance of classical calculations and processing in the QC during runtime of the algorithm (e.g., runtime analysis of inbound pulses received from the quantum processor).

During runtime and/or upon completion of a quantum algorithm performed by the QC, the QC may output data/results to the quantum programming subsystem. In an example implementation these results may be used to generate a new quantum algorithm description for a subsequent run of the quantum algorithm and/or update the quantum algorithm description during runtime. Additionally, the QC may output the raw or processed inbound pulses received from the quantum processor, representing qubits state estimation, or metadata representing the quantum program control flow and branching information, as well as internal variables computations during the program execution.

A QC comprises a plurality of pulse processors, which may be implemented in a field programmable gate array, an application specific integrated circuit or the like. A pulse processor is operable to control analog outbound pulses that drive a quantum element (e.g., one or more qubits and/or resonators) or allow interaction between quantum elements and digital outbound pulses that can control auxiliary equipment required for the program execution (e.g., gating the analog outbound pulses or controlling external devices like photon detectors). A pulse processor is also operable to receive inbound pulses from a quantum element.

Quantum algorithms are performed by one or more qubits interacting with quantum control pulses. These quantum control pulses are electromagnetic RF signals that are generated at baseband according to an analog waveform. The desired signals may generated according to a known set of instructions, involving various operations such as arithmetical or logical calculations, communication with various components and classical control flow operations (jump, branch, etc.) An application circuit in a pulse processor digitally generates samples of this analog waveform. These waveform samples are further modified according to post-processing instructions.

To facilitate complex quantum control patterns, the orchestration platform may make use of the internal control flow of the quantum controller. For example, suppose we want to reset a qubit's state to some known state (e.g., ground state), the process will involve measuring a qubit's state (thus, collapsing it to a classical state), and playing a pulse according to the measured result. Clearly, this type of sequence requires running a "classical" control flow that will trigger the playing of pulses according to the measured state. This process of sending pulses according to a given control flow may generate gaps between consecutive pulse plays. Another example is dynamically changing the waveform frequency, phase, amplitude or play duration time. The computation of calculation the new waveform parameters may induce gaps between one iteration and another. These gaps are undesired as they produce unexpected behavior (e.g., qubit state or phase de-coherence). Moreover, the gap width may only be known after compile time, which doesn't allow correction of the pulse pattern to align with the gap.

The signal generation in the quantum controller follows a known set of instructions, involving various operations such as arithmetical or logical calculations, communication with various components and classical control flow operations (jump, branch, etc.). For example, to reset a qubit's state to some known state (e.g., ground state), the process will involve measuring a qubit's state (thus, collapsing it to a classical state), and playing a pulse according to the measured result. This type of sequence requires running a control flow that will trigger the playing of pulses according to the measured state. This process of sending pulses according to a given control flow may generate gaps between consecutive pulse plays. To avoid gaps, the pulses may be generated separately from their execution, thereby pulses can be played together even if their generation is not consecutive.

The quantum program may be separated into two different segments. The first segment (the "Q-run") comprises encoding the qubits to a desired state and then reading the qubits through the resonators. The second segment comprises the classical computation phase. After the qubits are read, they are collapsed from superposition to a classical state of 0 or 1.

While the qubit is in superposition during the Q-run, gaps are not allowed, because the qubits accumulate global phase while in superposition. For example, if the qubit is in $1/\sqrt{2}(|0\rangle+|1\rangle)$, after specific time (related to the qubit resonating frequency), the state would be changed to $1/\sqrt{2}(|0\rangle+i|1\rangle)$ (quarter of a period), then to $1/\sqrt{2}(|0\rangle-|1\rangle)$ (half a period), then to $1/\sqrt{2}(|0\rangle-i|1\rangle)$ and then to $1/\sqrt{2}(|0\rangle+|1\rangle)$ again. Also, the qubits may lose coherency of state or phase (errors to qubits). Therefore, if gaps appear in the controller during the Q-run and pulses are not played for some fixed period of time, the qubit will not remain at the same state. This impairs the algorithm because the errors are not deterministic and because not playing anything for some duration may affect the program. Accordingly, gaps during Q-run must be avoided. Also, Q-run or the qubit lifetime is very limited. For example, in super conducting qubits it's about 100 μs. When time is lost due to gaps, there is less time available for playing meaningful pulses, and the effective lifetime becomes smaller because of the controller, thereby limiting the algorithm complexity to be less than optimal.

A quantum program may consist a set of Q-runs and classical phases and this algorithm iteration may repeat itself many times as the qubits have a statistical behavior when performing readout while the qubits are in a superposition state. Reducing gaps during the classical phase may reduce the overall runtime. However, avoiding gaps during Q-runs is more important as it is essential for maintaining the qubit state.

To avoid processing gaps, the waveform samples and the modification instructions are maintained in buffers that are accessed independently. To maintain coherency, the waveform samples and the modification instructions are read simultaneously by an execution controller.

The Quantum Device Operator (QDO) disclosed herein eliminates time gaps that may arise during a qubit runtime. Such gaps may be the result of dynamic computations that takes place at the application level. In certain scenarios, a set of dynamically generated pulses cannot be played in succession, because the required computations may be too time consuming to allow proper gating of the generation of the next inline subset of pulses. A buffer architecture is used in the QDO frontend to separate the timing of the pulse generation from the timing of the pulse playout. This buffer architecture ensures that the pulse playout occurs without gaps during designated time frames. The buffer content may be executed while the buffer is being written to. The compiler statically analyzes the maximum number of gap cycles that can occur in a particular experiment, and the compiler schedules the buffer execution using this analysis. The compiler can also evaluate a parametrized bound on the number of gap cycles, where the parameters are given by a run-time variable.

FIG. 1 illustrates a first example system for buffering the control of a quantum device in accordance with various example implementations of this disclosure.

The example system in FIG. 1 comprises an application circuit 101, a generation buffer circuit 103, a modification buffer circuit 105, an execution controller circuit 107, a digital-to-analog converter (DAC) 109, an RF modulator and a Qubit 113.

The application circuit 101 is configured to generate a plurality of waveform samples, a plurality of modification commands and a plurality of execution commands.

The generation buffer circuit 103 is configured to store the plurality of waveform samples. The waveform samples may comprise samples of analog and/or digital waveforms. Associated digital markers may be generated in parallel to the analog waveforms that are output from the DACs 109. The buffer 103 may be cyclic. Therefore, experiments are not limited by the buffer size. When the buffer is fully occupied, writing may continue to the start of the buffer as long as the executor has already read from this address. The application circuit is configured to write each of the plurality of waveform samples to the generation buffer circuit. Each waveform sample is a multibit (e.g., 16 bit) value corresponding to an analog pulse.

The modification buffer circuit 105 is configured to store the plurality of modification commands. Each modification command of the plurality of modification commands corresponds to a buffer location. The buffer location is associated with an address, within the modification buffer circuit, where each modification command is written. For example, the buffer location may be an absolute address or a relative offset (e.g., a relative negative offset that is used to determine the address to insert the new command in the buffer). Each modification command may comprise an opcode with associated values. The modification commands may be designated to shape and form the analog pulses. The execution of the modification commands is coupled to the analog pulses. The reason for the relative offset is to allow time for modification. For example, if a rotation of the waveform by 30 degrees takes 4 cycles to complete, the application may send the rotation opcode and rotation value at the same time as the actual waveform, and the application may place the modification 4 places before in the buffer. Therefore, the computation would be completed with the correct waveform. This relative negative offset may be used to prepare frame parameters (e.g., rotation coefficients) for waveform X during the generation of waveform X−1.

The DAC path (identified by the DAC index) consists of various digital modules that reshape the pulse according to the user specifications. The controlled parameters may include but are not limited to frequency, phase, gain, DC offset, equalizer coefficients, etc. The commands saved in the modification buffer are configuration commands for these modules. These commands have a certain latency associated with the complexity of the module.

To play two consecutive pulses with different parameters (e.g., frequency), the modification buffer can store a modification command that will be executed at the execution time of the previous pulse such that the added latency of the command will yield a modified frequency precisely at the beginning of the execution of the next pulse. This allows a seamless, gapless, execution of pulses.

The execution controller circuit 107 operates according to an execution command of a plurality of execution commands. An execution command may instruct the execution controller circuit 107 to read one or more waveform samples, of the plurality of waveform samples, from the generation buffer circuit. The execution command may, at the same time, instruct the execution controller circuit 107 to read a modification command, of the plurality of modification commands, from the modification buffer circuit. The execution controller circuit 107 is operable to modify the one or more waveform samples according to the modification command. According to the executer operation, the modification commands may take place in parallel to fetching a new analog pulse samples from the generation buffer circuit 103. Each execution command may comprise an opcode with associated values. An execution command may be used to add a delay (e.g., by a number of cycles) before reading begins or ends. An execution command may also be used to select (or jump to) a particular address in the generation buffer circuit 103 and the modification buffer circuit 105.

During the Q-run, there may be execution out of all buffers. A single executer, for example, may fetch data out of all buffers. For example, at time=T, the executer will fetch data out of address=A of all buffers. This requires all buffers to be aligned at the same time. To maintain buffer alignment, the analog data that enters the buffers is accompanied with digital data and modification data. When the modification frequency is slower than the analog/digital data rate, a "NOP" (no operation) may be added into the modification buffer.

The modified samples are associated with an outbound quantum control pulse. The modified samples are converted from digital domain to analog domain via a DAC 109. The samples may be digitally filtered and/or interpolated and/or modulated with a carrier frequency and/or have any subset of various attributes such as phase, frequency, chirp rate, amplitude and time modified prior to the DAC 109. The DAC 109 may be one of a plurality of DACs. The application circuit may associate particular samples with a corresponding DAC 109 by adding a DAC index to the samples. The data executed out of the analog buffer may be dynamically associated with a DAC. For example, sample 0 at T=0 can be directed to DAC0 and sample 1 at T=1 can be directed to DAC1. Multiple buffers can be directed at the same time to the same DAC. This would happen, for example, if each pulse out of the buffers is modulated with a different frequency and several quantum elements are fed to the same DAC line.

The output of the DAC 109 is upconverted, by the RF modulator 111, to an appropriate carrier frequency for the given Qubit 113 (or other quantum element).

Figure 2:
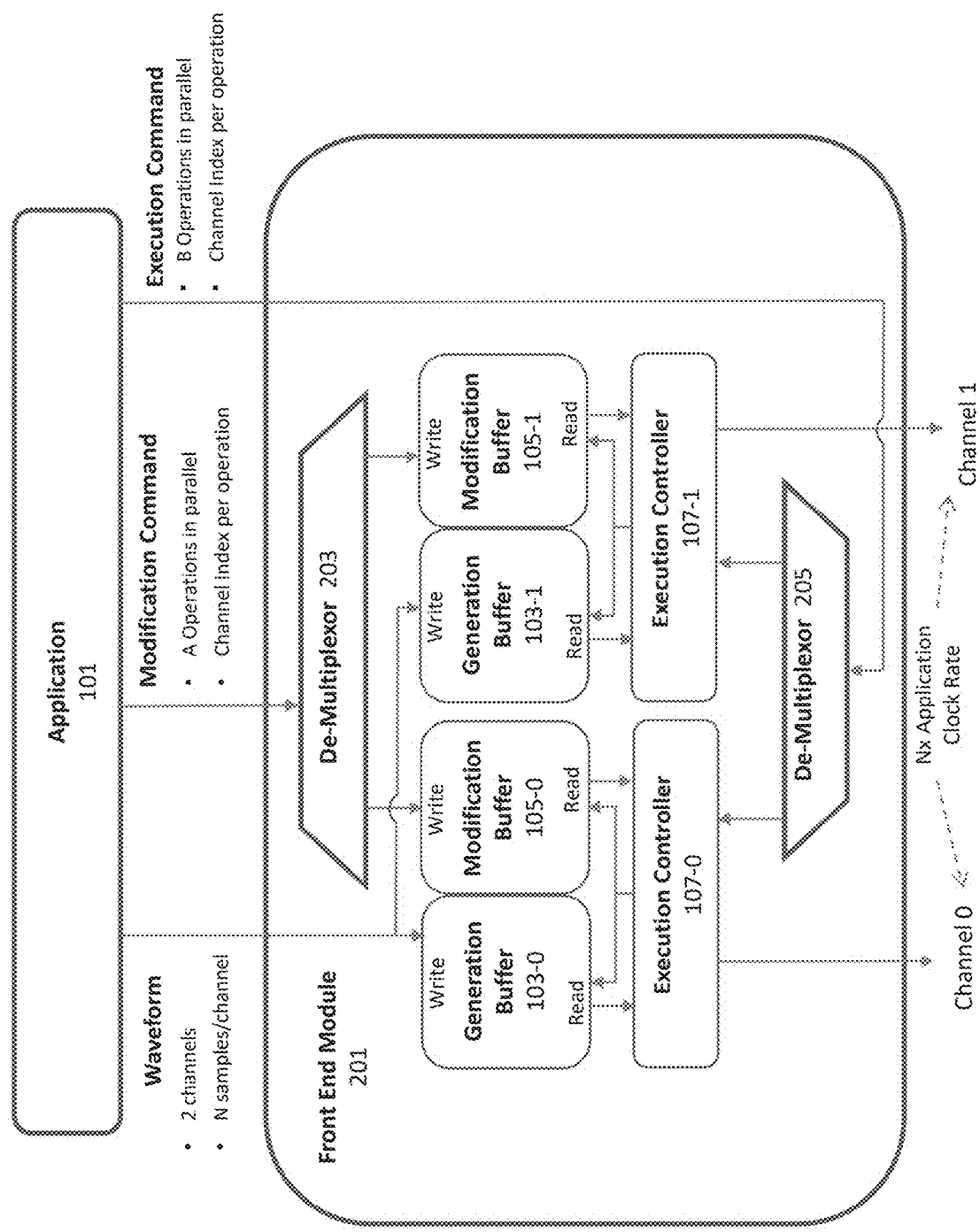
FIG. 2 illustrates a second example system for buffering the control of a quantum device in accordance with various example implementations of this disclosure.

FIG. 2 illustrates a second example system for buffering the control of a quantum device in accordance with various example implementations of this disclosure.

The second example system expands upon the first example system, of FIG. 1, by adding multiple channels and enabling higher rate sample generations in a front end module (FEM) 201.

The generation buffer circuit 103, of FIG. 1, is expanded to comprise two independent generation buffers 103-0 and 103-1. The modification buffer circuit 105, of FIG. 1, is expanded to comprise two independent modification buffers 105-0 and 105-1. The execution controller circuit 107, of FIG. 1, is expanded to comprise two independent execution controller 107-0 and 107-1. Channel 0 comprises one generation buffer 103-0, one modification buffer 105-0 and one execution controller 107-0. Channel 1 comprises one generation buffer 103-1, one modification buffer 105-1 and one execution controller 107-1. The application circuit 101 is configured to write to the plurality of generation buffers 103-0 and 103-1 independently. The buffer size correlates to the Q-run. If the qubit has a lifetime of 100 µs, for example, the maximal Q-run time is 100 µs and the buffer size is based on 100 µs. Accordingly, if the DAC operates at 1 GHz, the buffer size would need to allow 100K samples.

Each modification command, of the plurality of modification commands, may correspond to a channel index. The channel index identifies a modification buffer, of the plurality of modification buffers, to which each modification command is written. Two or more modification commands, of the plurality of modification commands, may written to the modification buffers simultaneously. Multiple (A) modification commands may be written in parallel to de-multiplexor 203. For example, 2 modification commands (one for each channel) may be written at one time, by de-multiplexor 203, to modification buffers 105-0 and 105-1. Each set of modification commands can affect any analog pulse. A set of modification commands is routed to the modification buffers associated with the analog generation buffers. Alternatively, one modification command may be written to 2 different modification buffers.

Each execution commands, of the plurality of execution commands, may correspond to a channel index. The channel index identifies the channel, of the plurality of channels, from which the one or more waveform samples and the modification command are read. Two or more execution commands, of the plurality of execution commands, operate simultaneously on two or more channels. Multiple (B) execution commands may be applied in parallel to de-multiplexor 205. For example, 2 modification commands (one for each channel) may be applied at one time, by de-multiplexor 205, to execution controllers 107-0 and 107-1. Alternatively, one execution command may be written to 2 different modification buffers either sequentially or in parallel. For example, at time 0, an execution command may be sent to trigger buffer 103-0 with delay 1, and at time 1, the execution command may be sent to trigger buffer 103-1 with delay 0. In this manner, both execution controllers 107-0 and 107-1 would begin at the exact same time, and a single executor command can trigger 2 buffers.

The channel may include various digital modules that will route the analog waveform to a specific physical DAC via DAC index, and reshape the pulse in accordance with physical requirements such as gain, frequency, phase, DC offset, apply a set of FIR and IIR filters, a cross correlation matrix, a correction matrix negating the physical imperfection of the DAC, a threshold or overflow detection and correction, etc. Following that, a modification command may alter various aspects of the pulse in a timely manner such that a seamless connection between two pulses may be achieved, even if the two pulses differ in any or all of the aforementioned physical aspects.

The execution controllers 107-0 and 107-1 govern the data and command fetching.

Figure 3:
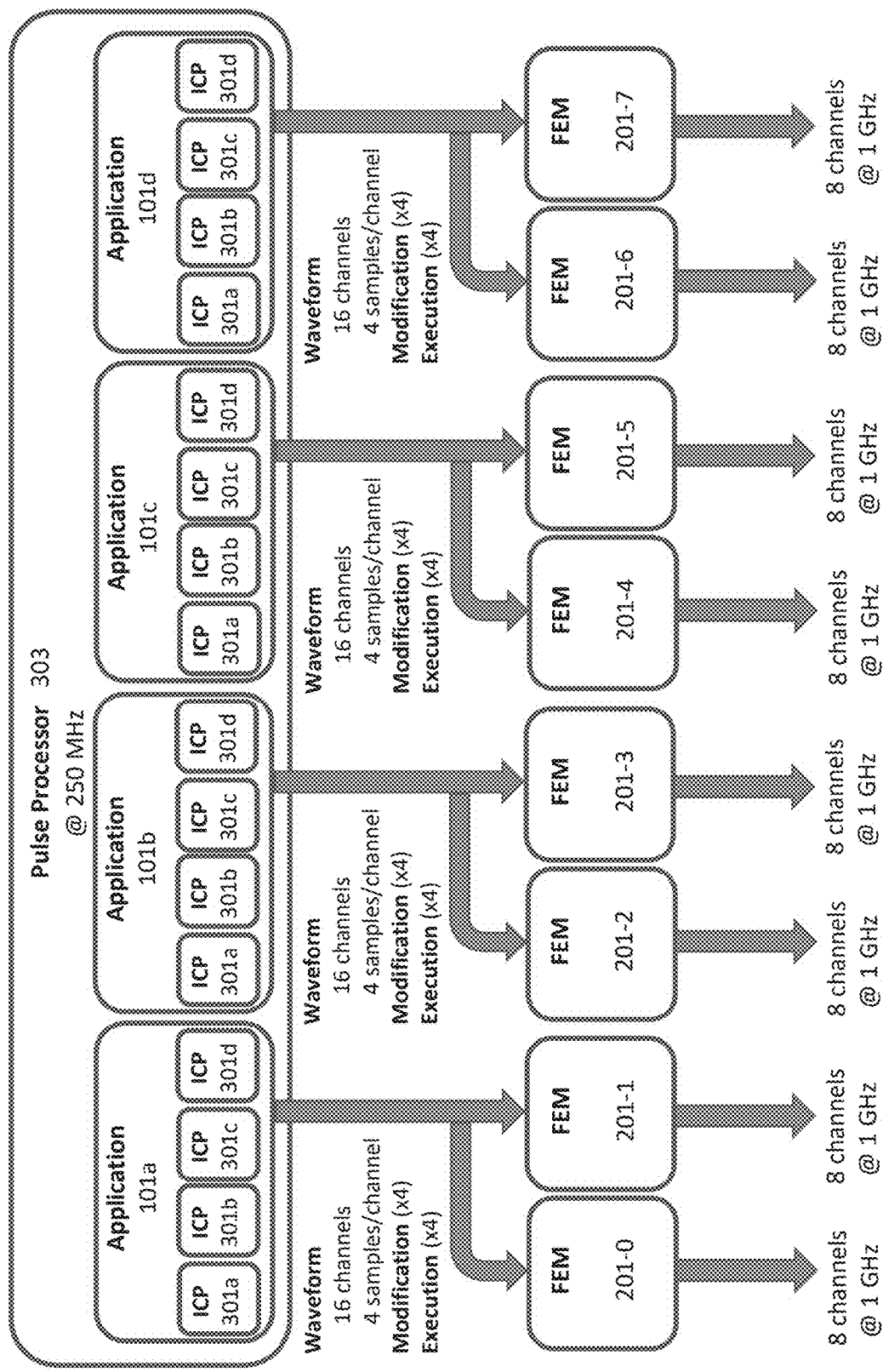
FIG. 3 illustrates a third example system for buffering the control of a quantum device in accordance with various example implementations of this disclosure.

FIG. 3 illustrates a third example system for buffering the control of a quantum device in accordance with various example implementations of this disclosure.

In the third example system, pulse processor 303 comprises 4 application circuits 101*a*, 101*b*, 101*c* and 101*d*. The pulse processor 303 comprises signal processing circuitry that receives local data and instructions as well as data from external resources. These inputs may indicate a quantum computer state or a trigger for processing a quantum computer state. Such indications may affect the program control flow.

Each application circuit 101*a*, 101*b*, 101*c* and 101*d* generates analog pulses according to generation commands from 4 internal classical processors (ICPs) 301*a*, 301*b*, 301*c* and 301*d*. The ICPs 301*a*, 301*b*, 301*c* and 301*d* in every application circuit 101*a*, 101*b*, 101*c* and 101*d* also generate modification commands and buffer execution commands to modify the analog pulses, as well as govern their timely execution. While FIG. 3 illustrates 4 APPs 101*a*, 101*b*, 101*c* and 101*d*, each with 2 FEMs 201-0 and 201-1 and operably coupled to 16 DACs, this is an example configuration, as alternative configurations, with other numbers of these elements, are contemplated.

The ICPs 301*a*, 301*b*, 301*c* and 301*d* in application circuit 101*a* generate modification commands and buffer execution commands that are sent to the two connected FEMs 201-0 and 201-1. The ICPs 301*a*, 301*b*, 301*c* and 301*d* in application circuit 101*b* generate modification commands and buffer execution commands that are sent to the two connected FEMs 201-2 and 201-3. The ICPs 301*a*, 301*b*, 301*c* and 301*d* in application circuit 101*c* generate modification commands and buffer execution commands that are sent to the two connected FEMs 201-4 and 201-5. The ICPs 301*a*, 301*b*, 301*c* and 301*d* in application circuit 101*d* generate modification commands and buffer execution commands that are sent to the two connected FEMs 201-6 and 201-7. A FEM, for example 201-0 or 201-1, of a pair may be identified by an index from the corresponding application circuit 101*a*.

In the third example system, 16 channels, each comprising 16-bit waveform samples, may be written independently, by each application 101*a*, 101*b*, 101*c* and 101*d*, at the same time. For example, the applications 101*a*, 101*b*, 101*c* and 101*d* and the pulse processor 303 may operate at 250 MHz, while the FEMs 201-0, 201-1, 201-2, 201-3, 201-4, 201-5, 201-6 and 201-7 output samples at 2 GHz. The internal clock (e.g., 250 MHz) does not have to be at the same rate of the external data rate (e.g., 2 GHZ), because the application circuitry may generate multiple samples (e.g., 8) at a slower, internal clock rate and a serializer/deserializer interface (serdes module) may transmit data to the FEM at the faster, external rate.

Figure 4:
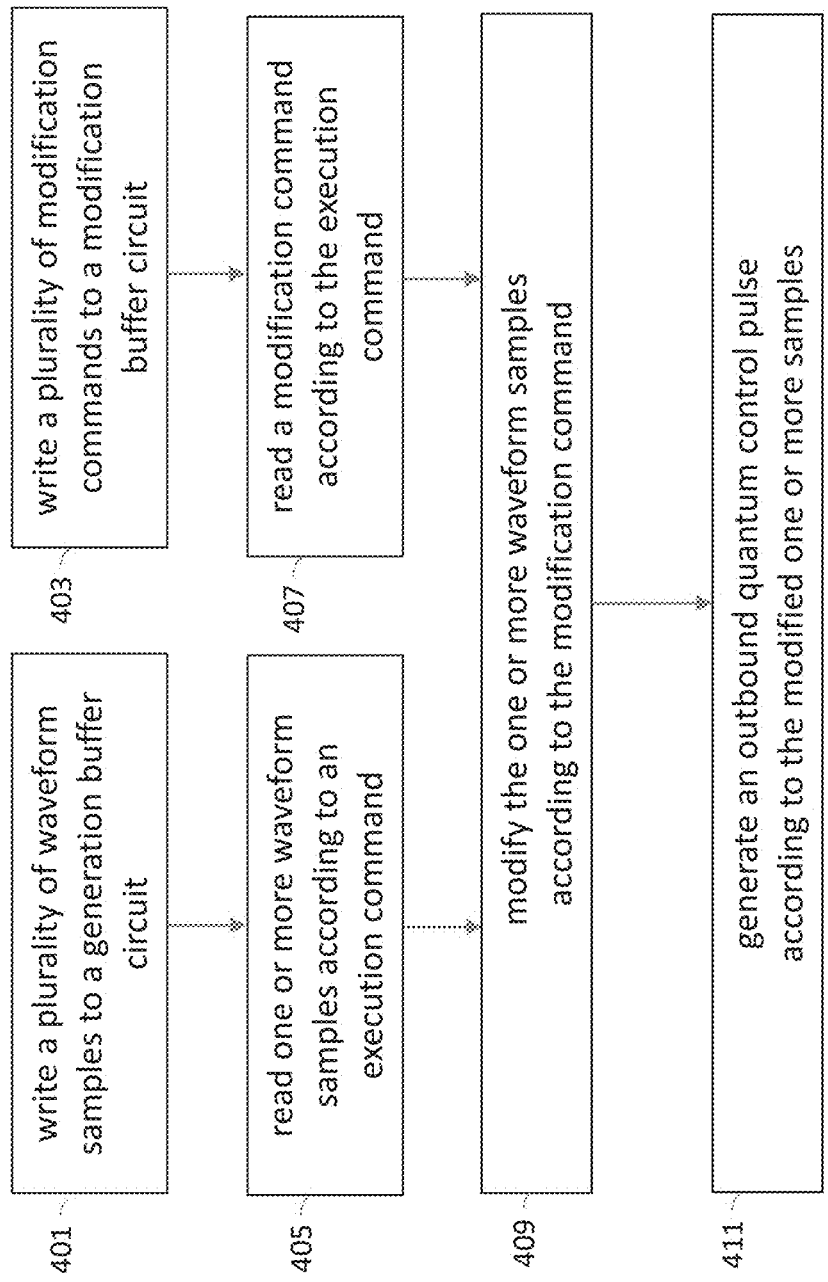
FIG. 4 illustrates a flowchart of an example method for buffering the control of a quantum device in accordance with various example implementations of this disclosure.

FIG. 4 illustrates a flowchart of an example method for configurable and distributive processing for quantum control in accordance with various example implementations of this disclosure.

The method comprises writing a plurality of waveform samples to a generation buffer circuit at 401, while writing a plurality of modification commands to a modification buffer circuit at 403. Multiple waveform samples may be simultaneously written to the generation buffer circuit. Each modification command of the plurality of modification commands corresponds to a buffer memory location or offset thereto. Each modification command is written to an address, in the modification buffer circuit, associated with the corresponding buffer location. Multiple modification commands may be simultaneously written to the modification buffer circuit. The buffers may be generated in an on-chip ram for fast operation and may also be implemented using an external DRAM when more memory is required.

In a multichannel system, each channel comprise a generator (in the application circuit), one generation buffer (within the generation buffer circuit), one modification buffer (within the modification buffers circuit), and one execution controller. A plurality of channels may be written to simultaneously. In a multichannel system, each modification command corresponds to an index that identifies a target channel.

At 405, one or more waveform samples are read from the generation buffer circuit, according to an execution command of a plurality of execution commands. At 407, a modification command is read from the modification buffer circuit, according to the execution command of the plurality of execution commands. The reading at 405 and the reading at 407 occur simultaneously. Multiple execution commands may operate simultaneously on two or more channels. In a multichannel system, each execution command corresponds to an index that identifies a target channel. The execution command activates a channel. The modification command may be NOP if no update is required.

At 409, the one or more waveform samples are modified according to the modification command. The modified one or more samples are associated with an outbound quantum control pulse. The outbound quantum control pulse may be generated, at 411, according to the modified one or more samples. The samples may be digitally filtered and/or interpolated and/or modulated with a carrier frequency and/or have any subset of various attributes such as phase, frequency, chirp rate, amplitude and time modified prior to the DAC 109.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical implementation may comprise one or more application specific integrated circuit (ASIC), one or more field programmable gate array (FPGA), and/or one or more processor (e.g., x86, x64, ARM, PIC, and/or any other suitable processor architecture) and associated supporting circuitry (e.g., storage, DRAM, FLASH, bus interface circuits, etc.). Each discrete ASIC, FPGA, Processor, or other circuit may be referred to as "chip," and multiple such circuits may be referred to as a "chipset." Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to perform processes as described in this disclosure. Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to be configured (e.g., to load software and/or firmware into its circuits) to operate as a system described in this disclosure.

As used herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As used herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As used herein, the term "exemplary" means serving as a non-limiting example, instance, or illustration. As used herein, the terms "e.g.," and "for example" set off lists of one or more non-limiting examples, instances, or illustrations. As used herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.). As used herein, the term "based on" means "based at least in part on." For example, "x based on y" means that "x" is based at least in part on "y" (and may also be based on z, for example).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system comprising:
   an application circuit, operable, according to a classical control flow, to generate a plurality of waveforms;
   a generation buffer circuit configured to store the plurality of waveforms; and
   an execution controller circuit operable to play the plurality of waveforms, wherein:

the playing of the plurality of waveforms enables a generation of a plurality of consecutive quantum control pulses, each consecutive quantum control pulse is generated according to one or more waveforms of the plurality of waveforms, and the playing of the plurality of waveforms enables a reshaping of the one or more waveforms of the plurality of waveforms to generate the plurality of consecutive quantum control pulses.

2. The system of claim 1, wherein:

the application circuit is configured to write each of the plurality of waveforms to the generation buffer circuit, wherein the plurality of waveforms comprise a plurality of analog waveforms and a plurality of digital waveforms, and each analog waveform of the plurality of analog waveforms comprises one or more multibit values that correspond to an analog signal.

3. The system of claim 1, wherein:

the application circuit is configured to independently write more than one waveform, at a time, to the generation buffer circuit.

4. The system of claim 1, wherein:

the generation buffer circuit comprises a plurality of generation buffers, and the application circuit is configured to write to the plurality of generation buffers independently.

5. The system of claim 1, wherein:

the application circuit is configured to generate a plurality of modification commands;

the system comprises a modification buffer circuit configured to store the plurality of modification commands; and the execution controller circuit is operable to:
  read a modification command, of the plurality of modification commands, from the modification buffer circuit, and
  modify a waveform, of the plurality of waveforms, according to the modification command.

6. The system of claim 5, wherein:

each modification command of the plurality of modification commands corresponds to a buffer location, and the buffer location is associated with an address, within the modification buffer circuit, where each modification command is written.

7. The system of claim 5, wherein:

the modification buffer circuit comprises a plurality of modification buffers, each modification command, of the plurality of modification commands, corresponds to a channel index, and the channel index identifies a modification buffer, of the plurality of modification buffers, to which each modification command is written.

8. The system of claim 5, wherein:

two or more modification commands, of the plurality of modification commands, are written to the modification buffer circuit simultaneously.

9. The system of claim 5, wherein:

the generation buffer circuit comprises a plurality of generation buffers, the modification buffer circuit comprises a plurality of modification buffers, the execution controller circuit comprises a plurality of execution controllers, each channel, of a plurality of channels, comprise one generation buffer, of the plurality of generation buffers, one modification buffer, of the plurality of modification buffers, and one execution controller, of the plurality of execution controllers, each execution commands, of a plurality of execution commands, is associated with a channel index, and the channel index identifies the channel, of the plurality of channels, from which the one or more waveforms and the modification command are read.

10. The system of claim 8, wherein:

two or more execution commands, of the plurality of execution commands, operate simultaneously on two or more channels.

11. The system of claim 1, wherein the application circuit is one of a plurality of application circuits in a pulse processor of a quantum computer.

12. The system of claim 1, wherein the plurality of waveforms comprises samples of analog waveforms and samples of digital waveforms.

13. The system of claim 1, wherein the execution controller circuit is operable to play the plurality of consecutive quantum control pulses continually during a lifetime of a qubit without any computational gaps.

14. The system of claim 1, wherein:

the execution controller circuit is operable to send one or more waveforms to a digital-to-analog converter (DAC) according to a DAC index fetched from the generation buffer circuit.

15. The system of claim 1, wherein:

the execution controller circuit is operable to fetch a plurality of samples, at the same time, from the generation buffer circuit; and each of the plurality of samples may be fetched according to a different DAC index.

16. The system of claim 1, wherein:

the execution controller circuit is operable to simultaneously send one or more waveforms to a plurality of DACs.

17. A method comprising:

writing, via an application circuit, according to a first control flow, a plurality of waveforms to a generation buffer circuit;

playing, via an execution controller circuit, according to a second control flow that is different than the first control flow, one or more waveforms of the plurality of waveforms from the generation buffer circuit; and generating, via the execution controller circuit, a plurality of consecutive quantum control pulses, wherein each consecutive quantum control pulse is generated according to a reshaping of at least one waveform as the plurality of waveforms that are played.

18. The method of claim 17, wherein the method comprises:

writing, via the application circuit, a plurality of modification commands to a modification buffer circuit;

reading, via the execution controller circuit, a modification command, of the plurality of modification commands, from the modification buffer circuit; and modifying, via the execution controller circuit, one or more waveforms according to the modification command.

19. The method of claim 18, wherein:

each modification command of the plurality of modification commands corresponds to a buffer location, and writing the plurality of modification commands to the modification buffer circuit comprises writing each modification command to an address, in the modification buffer circuit, associated with the corresponding buffer location.

20. The method of claim 18, wherein:
the modification buffer circuit comprises a plurality of modification buffers,
each modification command, of the plurality of modification commands, corresponds to a channel index, and
writing the plurality of modification commands to the modification buffer circuit comprises writing each modification command to a modification buffer, of the plurality of modification buffers, identified by the corresponding channel index.

21. The method of claim 18, wherein:
writing the plurality of modification commands to the modification buffer circuit comprises writing two or more modification commands, of the plurality of modification commands, to the modification buffer circuit simultaneously.

22. The method of claim 18, wherein:
the generation buffer circuit comprises a plurality of generation buffers,
the modification buffer circuit comprises a plurality of modification buffers,
each channel, of a plurality of channels, comprise one generation buffer, of the plurality of generation buffers, and one modification buffer, of the plurality of modification buffers,
playing the one or more waveforms, of the plurality of waveforms, from the generation buffer circuit comprises reading from a channel identified by a channel index,
reading the modification command, of the plurality of modification commands, from the modification buffer circuit comprises reading from the channel identified by the channel index, and
the modified one or more waveforms are associated with the channel identified by the channel index.

23. The method of claim 22, wherein:
two or more modification commands, of a plurality of modification commands, operate simultaneously on two or more waveforms.

24. The method of claim 17, wherein the plurality of waveforms are written to the generation buffer circuit by an application circuit, and wherein the application circuit is one of a plurality of application circuits in a pulse processor of a quantum computer.

25. The method of claim 17, wherein:
playing comprises sending one or more waveforms to a digital-to-analog converter (DAC).

26. The method of claim 17, wherein:
playing comprises simultaneously sending one or more waveforms to a plurality of DACs.

27. The method of claim 17, wherein:
each waveform, of the plurality of waveforms, comprise a multibit value corresponding to an analog signal.

28. The method of claim 17, wherein:
writing the plurality of waveforms to the generation buffer circuit comprises independently writing more than one waveform, at a time, to the generation buffer circuit.

29. The method of claim 17, wherein the plurality of waveforms comprises samples of analog waveforms and samples of digital waveforms.

30. The method of claim 17, wherein playing comprises playing the plurality of consecutive quantum control pulses continually during a lifetime of a qubit.

31. The method of claim 17, wherein:
the method comprises sending, via the execution controller circuit, one or more waveforms to a digital-to-analog converter (DAC) according to a DAC index fetched from the generation buffer circuit.

32. The method of claim 17, wherein:
the method comprises: simultaneously fetching, via the execution controller circuit, a plurality of samples from the generation buffer circuit according to a plurality of different DAC indices.

33. The method of claim 17, wherein:
the generation buffer circuit comprises a plurality of generation buffers, and
writing the plurality of waveforms to the generation buffer circuit comprises writing to the plurality of generation buffers independently.

* * * * *